United States Patent [19]

Dutra

[11] Patent Number: 4,935,952
[45] Date of Patent: Jun. 19, 1990

[54] ALARM-RESPONSIVE APPARATUS AND METHOD

[75] Inventor: Jonathan A. Dutra, San Jose, Calif.

[73] Assignee: B-Warned, Inc., Clifton, N.J.

[21] Appl. No.: 218,638

[22] Filed: Jul. 13, 1988

[51] Int. Cl.$^5$ .................. H04M 11/04; G08B 17/00; H04R 29/00

[52] U.S. Cl. ........................ 379/40; 379/43; 381/58; 381/56; 340/533; 340/540

[58] Field of Search ............ 379/37, 39, 40, 43, 379/46; 381/56, 58; 340/531, 533, 540

[56] References Cited

U.S. PATENT DOCUMENTS

| | | | |
|---|---|---|---|
| 3,617,640 | 11/1971 | Cichanowicz | 379/40 |
| 3,647,974 | 3/1972 | Geisler et al. | 379/42 |
| 4,134,109 | 1/1979 | McCormick et al. | 340/550 |
| 4,509,189 | 4/1985 | Simpson | 381/56 |
| 4,520,503 | 5/1985 | Kirst et al. | 379/39 |
| 4,558,181 | 12/1985 | Blanchard et al. | 379/40 |
| 4,612,535 | 9/1986 | Sequin et al. | 340/531 |
| 4,617,555 | 10/1986 | Sheiman | 340/531 |
| 4,668,941 | 5/1987 | Davenport et al. | 340/550 |

FOREIGN PATENT DOCUMENTS

| | | | |
|---|---|---|---|
| 52-51896 | 4/1977 | Japan | 340/531 |
| 2068678 | 8/1981 | United Kingdom | 381/103 |

Primary Examiner—Jin F. Ng
Assistant Examiner—Wing F. Chan
Attorney, Agent, or Firm—A. C. Smith

[57] ABSTRACT

A method and apparatus for detecting a fire-alarm acoustic signal includes an energy discriminator to segregate the desired acoustic tone from background noise. Digital circuitry responds to the active output of the energy discriminaton to dial into a telephone network and execute verification operations before repeating the cycle while the acoustic tone of the fire alarm continues to be detected.

8 Claims, 5 Drawing Sheets

4,935,952

ALARM-RESPONSIVE APPARATUS AND METHOD

BACKGROUND OF THE INVENTION

Field of the Invention

This invention relates to apparatus and method for responding to an audible alarm in the presence of background noise, and more particularly to apparatus and method for audibly detecting smoke or fire alarm signals for implementing automatic telephone alert with safeguards and selective exclusions to enhance accuracy of detection.

Certain known smoke or heat detectors include inexpensive battery-operated, self-contained circuitry and apparatus that is capable of unattended operation at diverse locations around a dwelling or other structure to detect abnormal amounts of smoke or heat as an indication of a fire, and to produce a continuous loud tone intended to alert occupants of the dwelling or structure to the danger. Such self-contained devices may be positioned in numerous locations about a dwelling or structure as an add-on after construction of the structure and be dependable for sounding the tone upon detection of fire conditions. Because many such devices may be positioned around a structure, it has not been convenient to provide wire network connections to the devices, particularly in add-on installations in finished structures. In addition, these self-contained devices with limited battery power have generally not been capable of sensing fire conditions inside a structure for producing sufficiently loud tones to be audible outside the structure. Further, the warning tone produced by such devices is intended to evoke the human responses necessary to ensure personal safety and to initiate the counter measures to contain the fire danger. However, in circumstances where no humans are present within the audible range of the device inside or outside the structure, no human responses can be expected to contain the destructive effect of fire.

SUMMARY OF THE INVENTION

Accordingly, it is an object of the present invention to provide improved method and apparatus for selectively responding to the tones of smoke and heat detectors within a structure in order to initiate an automatic emergency call for assistance without relying upon human reaction to the alarm tones. The method and apparatus of the present invention discriminates against background noises to selectively respond promptly only to the desired alarm tone. Automatic dial-up of a selected emergency number is initiated, and selective call-back procedures are included to facilitate verification of the emergency call and the location from which it originates.

DESCRIPTION OF THE PREFERRED EMBODIMENT

Figure 1:
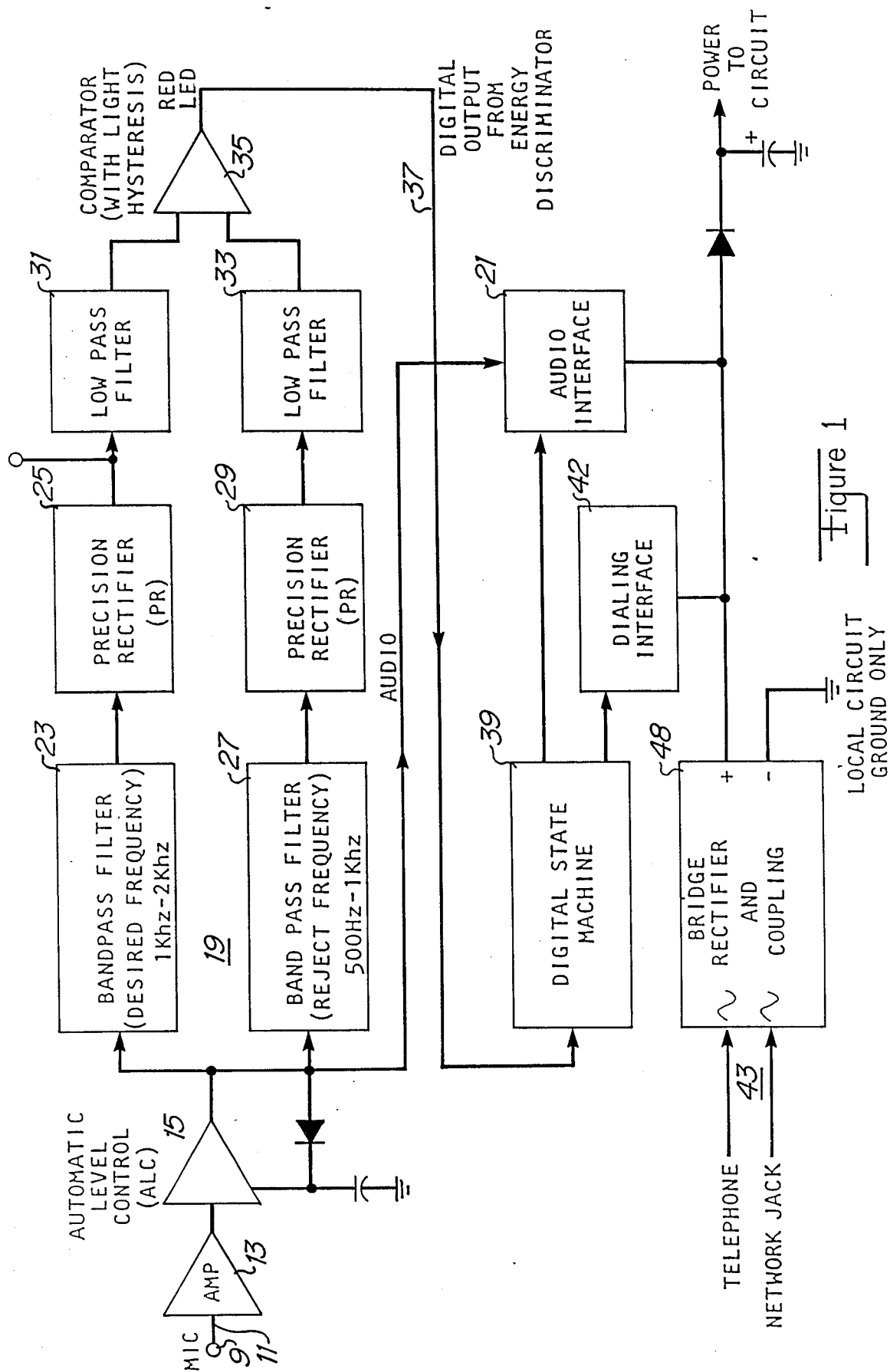
FIG. 1 is a block schematic diagram of one embodiment of the fire alarm detector according to one embodiment of the present invention.
Figure 2:
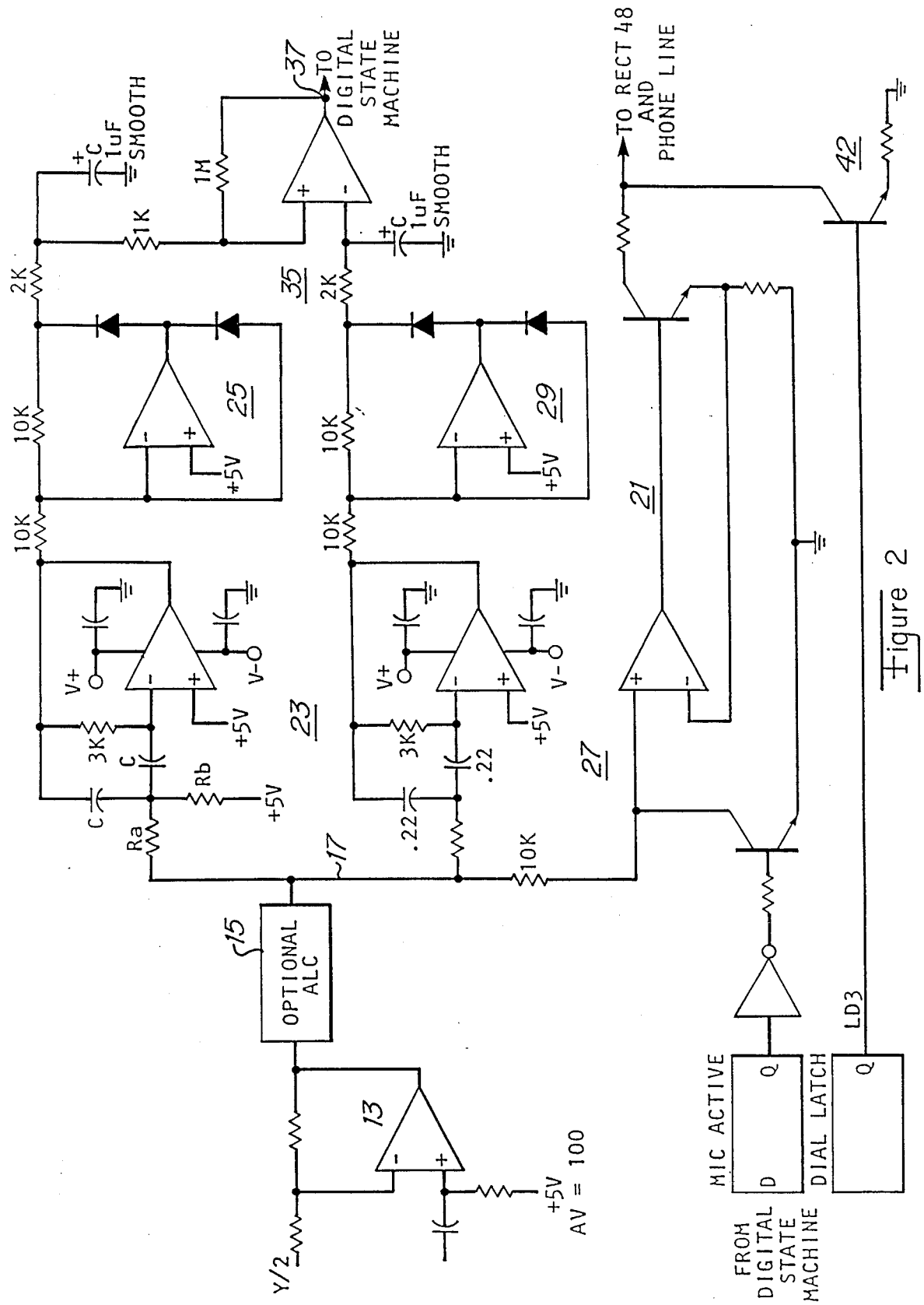
FIG. 2 is a schematic diagram of a portion of the circuitry of FIG. 1.

Referring now to the block and schematic diagrams of FIGS. 1 and 2, there is shown one embodiment of the present invention in which an audio input device such as a microphone 9 may be located within a structure to respond to one or more smoke or heat detectors (generally, fire-alarms) within the structure. The output of microphone 9 is supplied via conductors 11 to input amplifier 13 and the automatic level control circuit 15 of conventional design. This input circuitry operates with high sensitivity to low-level sounds and with reduced sensitivity to higher-level sounds to supply an output signal 17 of relatively constant amplitude to the energy discriminator circuitry 19 and to the audio interface 21.

The energy discriminator 19 includes a signal channel for the desired frequencies and a signal channel for the reject signal frequencies. Specifically, band-pass filter 23 passes signal frequencies in the range from about 1KHz to about 2KHz to precision rectifier circuit 25 which produces a D.C. signal 70 therefrom that is indicative of the acoustic energy present within the desired frequency range.

Figure 4:
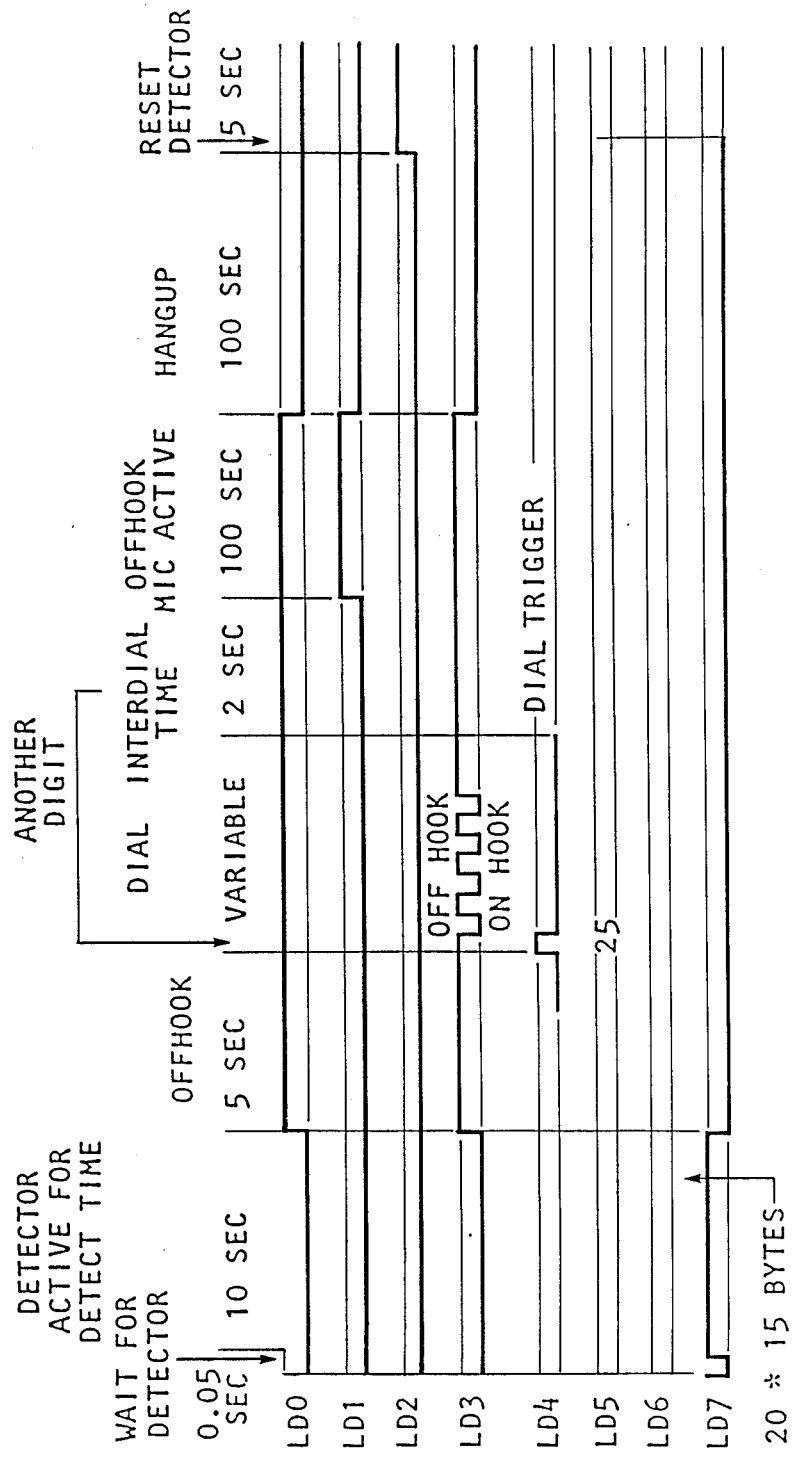
FIG. 4 is a chart showing the timing and sequence of signals present during operation of the circuits of FIGS. 1 and 2.
Figure 5:
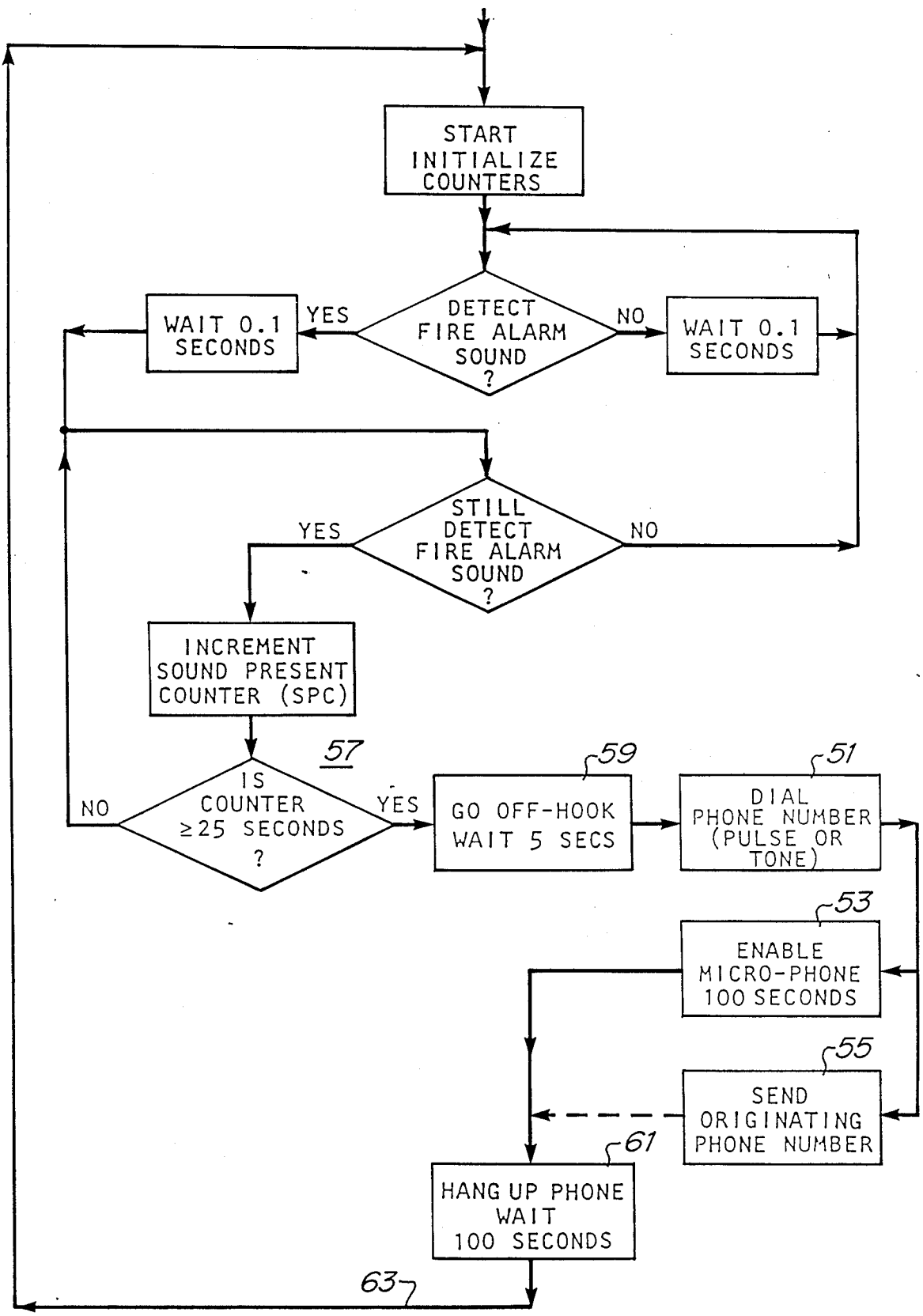
FIG. 5 is a signal flow chart illustrating the method of the present invention.

At the same time, the output signal 17 from the automatic level control stage 15 is supplied to the band pass filter 27 in the channel for reject signal frequencies. This filter 27 passes signal frequencies in the range from about 500Hz to about 1KHz to the precision rectifier 29 which produces a D.C. signal 71 therefrom that is indicative of the acoustic energy present within the reject frequency range. Additional band pass and/or band reject filters may be included, tuned to selected bands, as desired. The frequency range selected by the filters 23 and 27 are determined on the basis of the typical tonal frequencies generated by fire alarms of the type previously described. Thus, it has been determined that the great majority of such fire alarms emit steady tones in the range of about 1KHz to 2KHz, and that other noises commonly present inside a structure are intermittent and with some tonal frequencies at lower acoustic energy levels within the reject band of frequencies from about 500Hz to 1KHz. Of course, responses in the desired band and in the reject band may also be configured in an alternative embodiment of the present invention to be determined from the magnitude of signal exceeding a minimum threshold level and having component frequencies within the desired range from about 1KHz to about 2KHz, and from the magnitude of signal exceeding a minimum threshold level and having component frequencies within the reject range from about 500 Hertz to about 1KHz. Television and radio programming, conversation, footsteps, and the like, typically include acoustic energy within the reject band of frequencies that can provide a reference level of acoustic energy. Accordingly, the outputs of the precision rectifiers 25, 29 are supplied via respective low-pass filters 31, 33 to the comparator 35 which may include conventional hysteresis and threshold-level sensing to produce a low output (or logical '0') under conditions of high levels of acoustic energy within the desired tonal frequency range that exceed the levels of acoustic energy within the reject range of tonal frequencies. Similarly, the comparator 35 produces a high output (or logical '1') under conditions of high levels of acoustic energy within the reject range of tonal frequencies that exceed the level of acoustic energy within the desired range of tonal frequencies. The circuitry including the band-pass filters essentially functions as an energy discriminator that responds to fire-alarm tones in the presence of background noise to supply a '0' output on line 37 (active state) to the digital state machine 39, and responds to background noise alone in the absence of any fire alarm tone to produce a '1' output on line 37 (inactive state). Of course, other logical signal conventions may also be employed to indicate the active state as a logical '1', where desired. Also, match filters may be used to enhance the integrity of detection of the acoustic energy present within a structure in order to avoid false triggering on extraneous noises. Referring to the timing diagram of FIG. 4 and to the flow chart of FIG. 5, a timed-detection interval determines whether the desired tonal frequency is present and uninterrupted for a period of, say, 25 seconds. Such a time detection interval is intended to prevent false triggering on such tonal sources as Emergency Broadcast Test signals, television test patterns, musical performances, and the like, which can be expected not to last for 25 seconds. Additionally, conventional notch filter circuits as previously discussed, also may be incorporated into the desired frequency channel to reject the specific frequencies of Emergency Broadcast Test signals and of the television test patterns that are available on the channels in a given area at designated frequencies.

Figure 3:
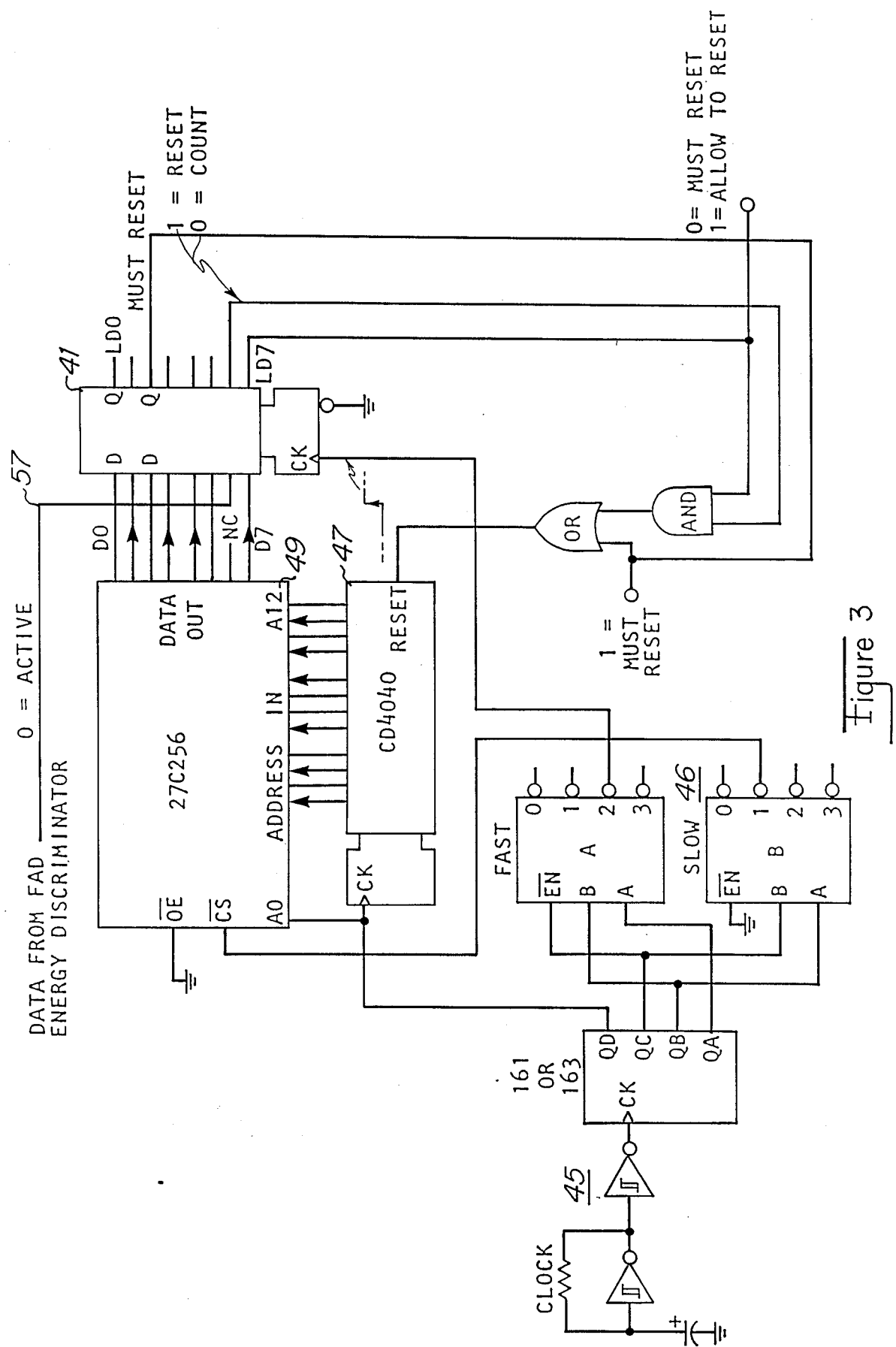
FIG. 3 is a block schematic diagram of a digital state machine according to the embodiment illustrated in FIG. 1.

The logical signals at the output of the comparator 35 may be applied to an indicator light and controller (not shown), and is also applied to the state machine 39, for example, of the type illustrated in the block schematic diagram of FIG. 3. The logical signal '0' on line 37 from the comparator 35 is clocked into latch 41 (e.g., type 74C374 or 74C574) so that the operation of the state machine may continue in recurring clock cycles independent of the presence of the active signal on line 37. In general, the state machine 39 automatically dials a preselected number (e.g., an insurance or security company, local fire station, etc.) 51 via the dialing interface 42 and then connects the audio signal 53 via the audio interface 21 to the telephone lines for, say, 100 seconds. The signal received by the microphone 9 is thus supplied to the telephone lines for reception and analysis at the preselected number. Tracing may take place while this telephone connection is active so that the appropriate authorities may be notified to take corrective actions. In another embodiment of the invention, the state machine 39 is configured to provide repetitive tonal indication of the telephone number from which the call was automatically initiated 55 to facilitate locating the site from which the call was made. The state machine 39 includes the Programmable Read-Only Memory (PROM) 49 (e.g., type 27C256) operating on specific clock cycles under control of the clock circuit 45 and the counter 46, 47 that provides sequential addresses to the PROM 49 in conventional manner. Thus, with reference to the timing diagram of FIG. 4, once the circuitry detects the active signal on line 37 for a detection interval of, say, 25 seconds, it detects whether the active signal (and, hence, the fire-alarm tone) was present uninterruptedly for 25 seconds 57. If so, there is a 5-second wait for a dial tone 59, and then dials into the telephone network 43 using pulse-dialing techniques for universal operation on any telephone network, and remains on-line (i.e., off the 'hook') for about 100 seconds. This sequence of operations occurs under control of the PROM 49 that can be programmed with the preselected number or numbers to be dialed automatically, and can be programmed to provide the clock-timed responses all in conventional manner. During the 100-second, off-hook operation, the microphone 9 is also connected to the telephone line 43 via the bridge and coupling circuit 48 (which supplies power to the present circuitry from the telephone network), and via the audio interface 21 so that the activity within the structure which triggered operation of the present invention can actually be heard and analysed.

After the 100-second interval, the telephone is disconnected (e.g. 'hung up') to permit the entity that was called to call back 61. No automatic answering capability is required because if no one is present to answer the phone manually (and thereby give explanation of the conditions within the structure that triggered the fire-alarm detection), then the appropriate authorities can be dispatched to the structure to take requisite action. This operating sequence can be repeated 63, after a reset interval, for as long as the energy discriminator detects high levels of acoustic energy in the desired frequency range. And, as long as an active signal is present on line 37, data will be clocked from the PROM 49 in a brief moment at each clock cycle into the latch 41 where the data is held until the next clock cycle. Thus, the Latch Data output 7 is a logic '0' for a clock cycle if the active signal '0' is present on line 37, and this LD output indicates that the counter 46, 47 must count through its entire cycle of say 250 seconds. If the energy discriminator indicates inaction by providing logic '1' on line 37, then LD6 is latched as logic '0' and this indicates that the counter should reset, and remain reset in each clock cycle until an active '0' logic signal appears on line 37.

Therefore, the method and apparatus of the present invention can respond to the distinctive tonal alarms of one or more heat or smoke detectors in a structure to implement automatic telephone communication with approved entities that can audibly monitor the conditions within the structure which initiated the automatic telephone connection prior to dispatching requisite emergency services.

I claim:

1. A method of responding to an acoustic alarm signal in ambient acoustical conditions, comprising the steps of:

sensing a parameter indicative of acoustic energy of the signal occurring in ambient acoustical conditions within a first frequency band;

sensing a parameter indicative of acoustic energy of the signal occurring in ambient acoustical conditions within a second frequency band;

comparing the sensed parameter within the first frequency band to the sensed parameter within the second frequency band; and initiating an output indication in response to the comparison of the sensed parameters for a preselected time interval.

2. The method according to claim 1 wherein in the steps of sensing the parameter of the signal within the first frequency band and the parameter of the signal in the second frequency band, a level of acoustic energy occurring within the first frequency band from substantially 1 kilohertz to substantially 2 kilohertz is sensed; and a level of acoustic energy occurring within the second frequency band of substantially 0.5 kilohertz to substantially 1 kilohertz is sensed; and in the step of comparing, the sensed parameter occurring within the first frequency band is detected for the selected time interval.

3. The method according to claim 1 wherein the sensed parameter within the first frequency band and the sensed parameter within the second frequency band include the magnitude of the acoustic energy within the respective frequency bands.

4. The method according to claim 1 wherein the sensed parameter within the first frequency band includes the frequencies in the range from substantially 1 kilohertz to substantially 2 kilohertz occurring within the first frequency band of signal amplitudes; and the sensed parameter within the second frequency band includes the frequencies in the range from substantially 500 hertz to substantially 1 kilohertz occurring within the second frequency band of signal amplitudes.

5. The method according to claim 2 wherein in the step of comparing, the second parameter within the first frequency band is detected as having a greater magnitude than the sensed parameter within the second frequency band for the selected time interval.

6. Apparatus for sensing an acoustical alarm signal in the presence of ambient acoustical conditions comprising:

transducer means disposed to respond to acoustical conditions for producing electrical signals therefrom;

discriminator means coupled to receive the electrical signals from the transducer means for producing a first output therefrom in response to a selected parameter indicative of acoustic energy within a first frequency band, and for producing a second output therefrom in response to a selected parameter indicative of acoustic energy within a second frequency band;

means responsive to the first and second outputs for producing a control signal in response to comparison of a selected logical combination thereof; and circuit means responsive to the control signal and connectable to a telephone network for establishing a preselected connection in said network in response to the occurrence of said control signal for a selected time interval.

7. Apparatus as in claim 6 wherein said discriminator means produces said first output in response to frequencies of said electrical signals within the first frequency band from substantially 1 kilohertz to substantially 2 kilohertz, and produces said second output in response to frequencies of said electrical signals within said second frequency band from substantially 500 hertz to substantially 1 kilohertz.

8. Apparatus as in claim 6 wherein said means produces said control signal in response to said first output exceeding said second output.

* * * * *